(12) United States Patent
Hara

(10) Patent No.: US 12,100,423 B2
(45) Date of Patent: Sep. 24, 2024

(54) MAGNETIC DISK DEVICE AND HEAD CONTROL METHOD

(71) Applicants: Kabushiki Kaisha Toshiba, Tokyo (JP); Toshiba Electronic Devices & Storage Corporation, Tokyo (JP)

(72) Inventor: Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/184,237

(22) Filed: Mar. 15, 2023

(65) Prior Publication Data

US 2024/0112700 A1   Apr. 4, 2024

(30) Foreign Application Priority Data

Sep. 22, 2022   (JP) .................................. 2022-151035

(51) Int. Cl.
*G11B 21/02*   (2006.01)

(52) U.S. Cl.
CPC .................................. *G11B 21/02* (2013.01)

(58) Field of Classification Search
None
See application file for complete search history.

(56) References Cited

U.S. PATENT DOCUMENTS

| | | | |
|---|---|---|---|
| 6,744,591 B2 | 6/2004 | Nakagawa et al. | |
| 8,363,350 B2 * | 1/2013 | Matsuzawa | G11B 5/5552 360/78.05 |
| 8,446,687 B2 * | 5/2013 | Hironaka | G11B 5/59694 360/78.04 |
| 9,738,023 B2 | 8/2017 | Ohta et al. | |
| 10,002,630 B1 * | 6/2018 | Vu | G11B 5/59627 |
| 10,930,311 B2 * | 2/2021 | Matsuzawa | G11B 5/5534 |
| 11,189,309 B1 * | 11/2021 | Ehrlich | G11B 5/553 |
| 11,189,310 B1 | 11/2021 | Calfee et al. | |
| 11,205,450 B2 | 12/2021 | Calfee et al. | |
| 11,514,939 B2 * | 11/2022 | Ehrlich | G11B 5/556 |
| 11,688,423 B2 * | 6/2023 | Calfee | G11B 5/4873 360/78.05 |
| 11,862,196 B1 * | 1/2024 | Ehrlich | G11B 21/106 |
| 2021/0366511 A1 * | 11/2021 | Calfee | G11B 5/5578 |
| 2021/0366512 A1 * | 11/2021 | Calfee | G11B 5/5547 |

FOREIGN PATENT DOCUMENTS

| | | |
|---|---|---|
| JP | 2001-249702 A | 9/2001 |
| JP | 2010-282680 A | 12/2010 |
| JP | 5731933 B2 | 6/2015 |

OTHER PUBLICATIONS

T. Semba et al., "Adaptive Cancellation of Self-Induced Vibration," IEEE Transactions on Magnetics, vol. 47, No. 7, Jul. 2011, pp. 1958-1963, DOI: 10.1109/TMAG.2011.2138685.

* cited by examiner

*Primary Examiner* — Fred Tzeng
(74) *Attorney, Agent, or Firm* — Kim & Stewart LLP

(57) ABSTRACT

According to one embodiment, a magnetic disk device comprises a feedforward control unit, which includes a plant model processing unit including a plurality of submodel processing units. Each of the submodel processing units generates a submodel output value that is an output value for an input value to be input, and the feedforward control unit generates the output value based on a plurality of the submodel output values.

12 Claims, 10 Drawing Sheets

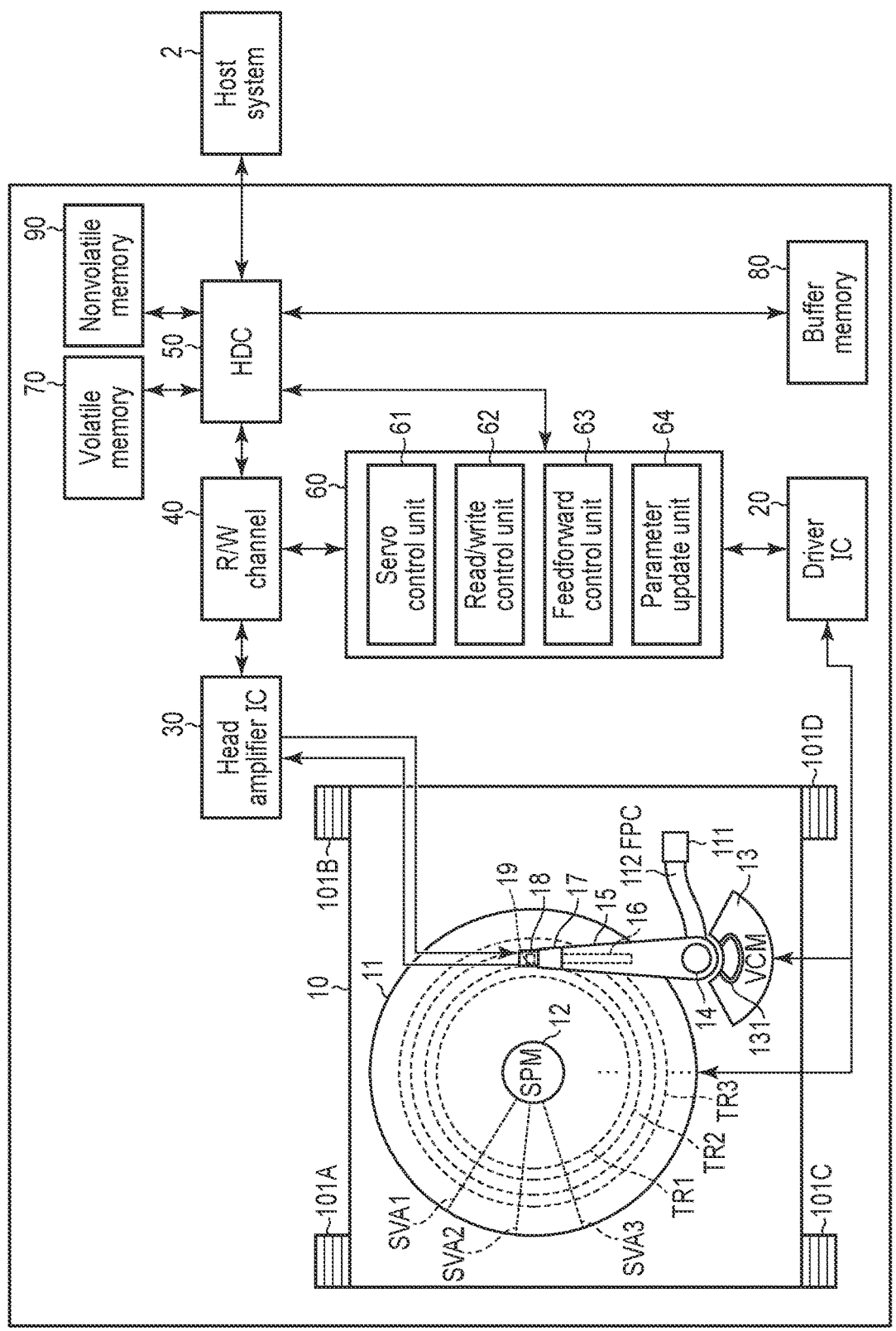
F I G. 1

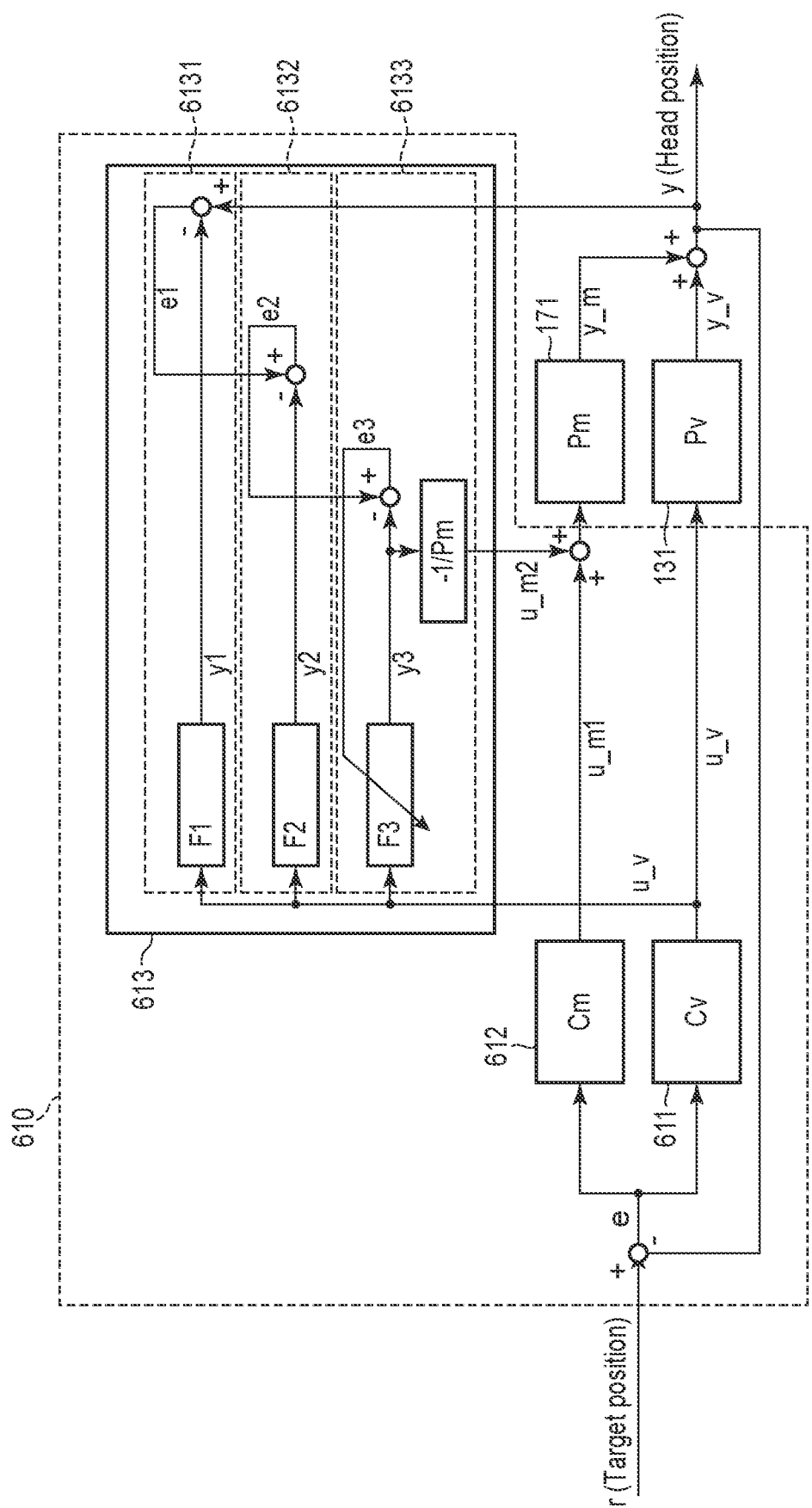
F I G. 2

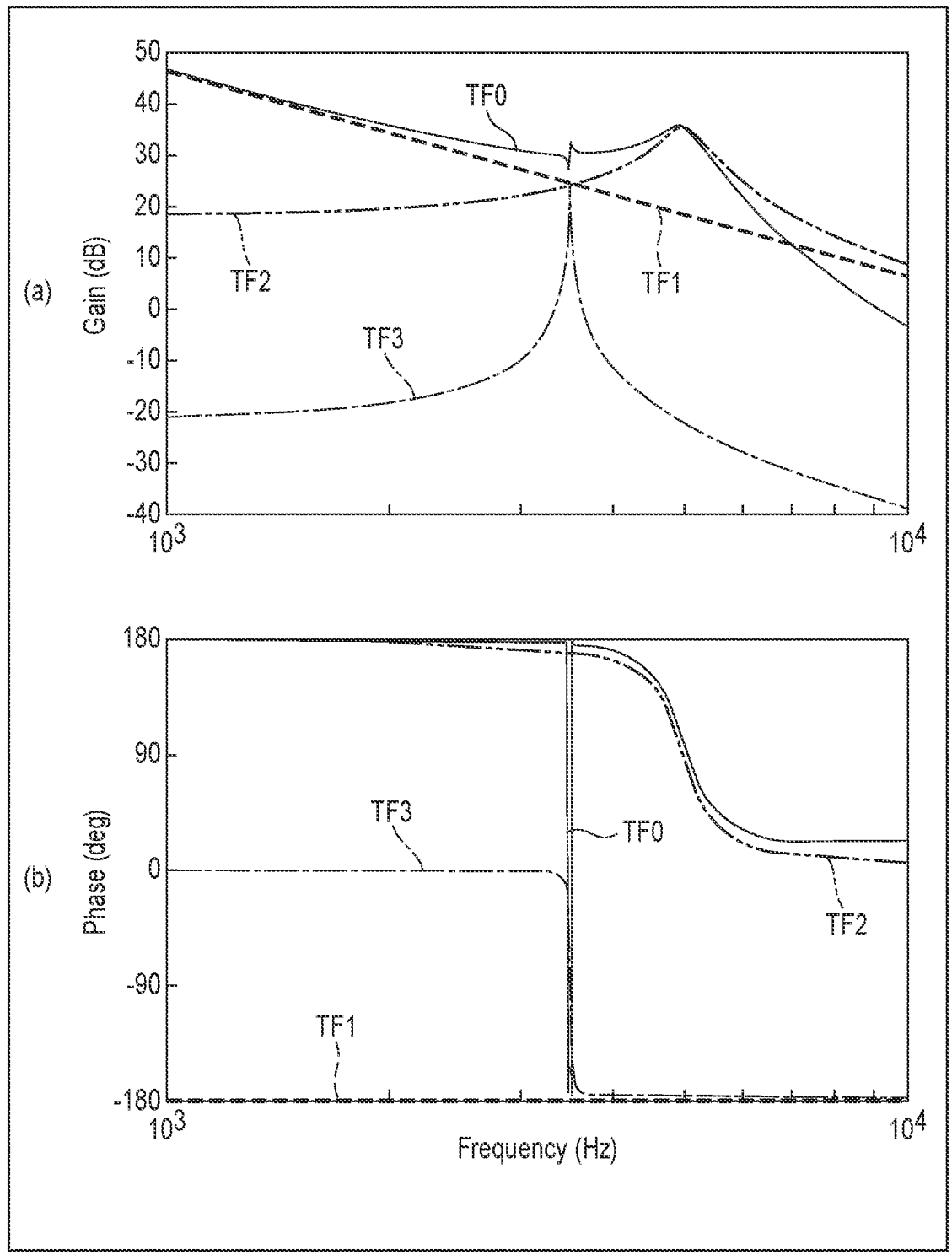
F I G. 3A

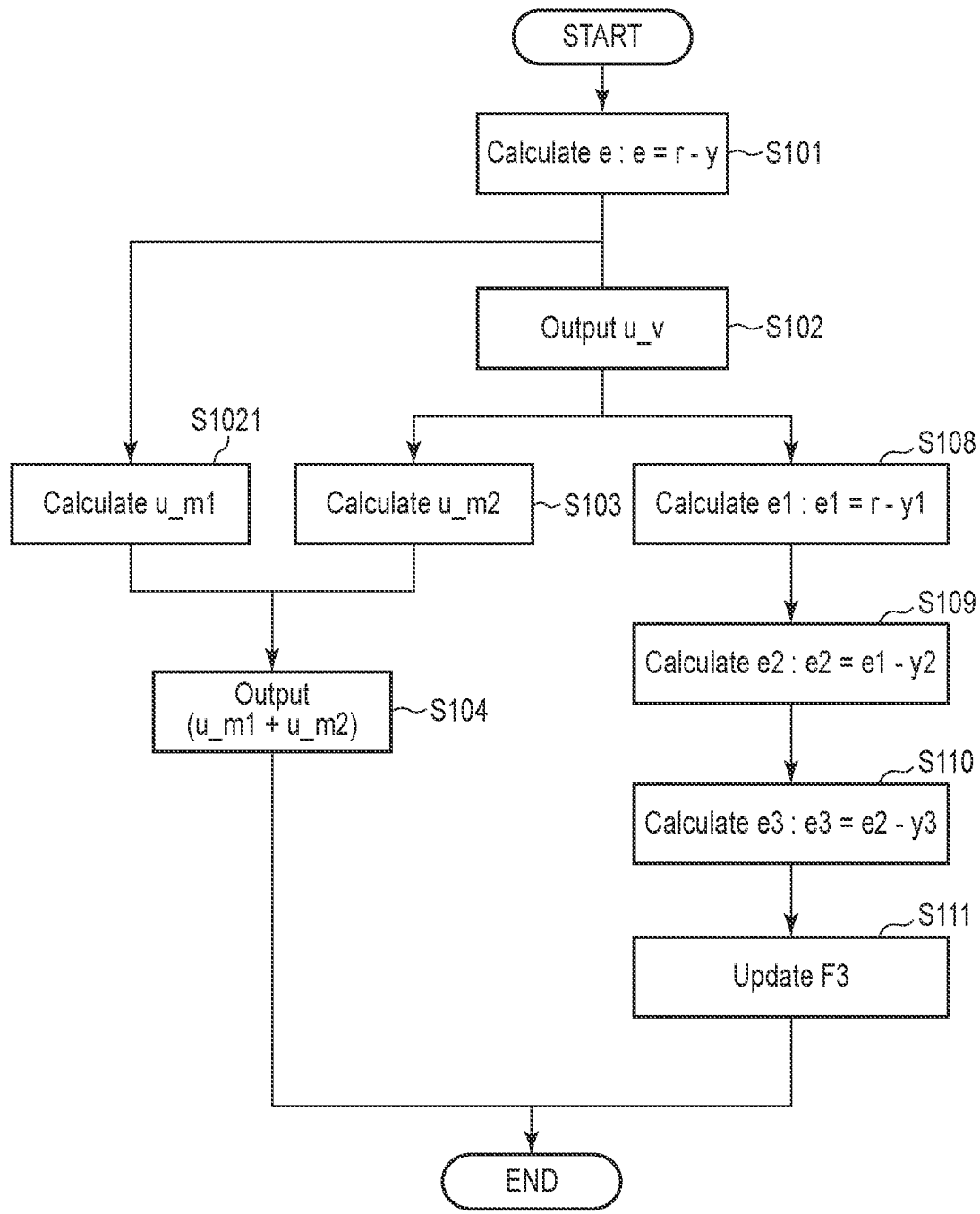
F I G. 4

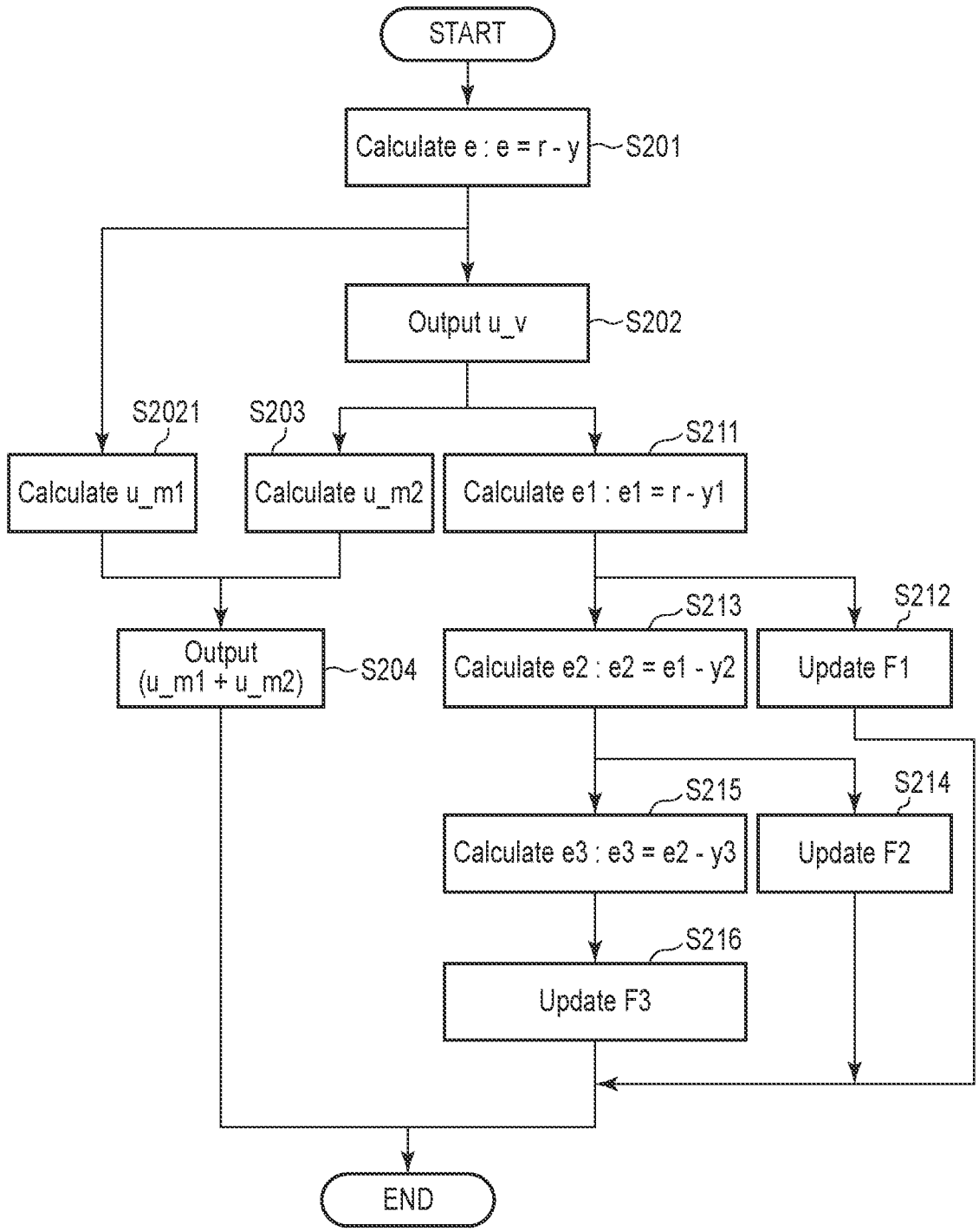
F I G. 6

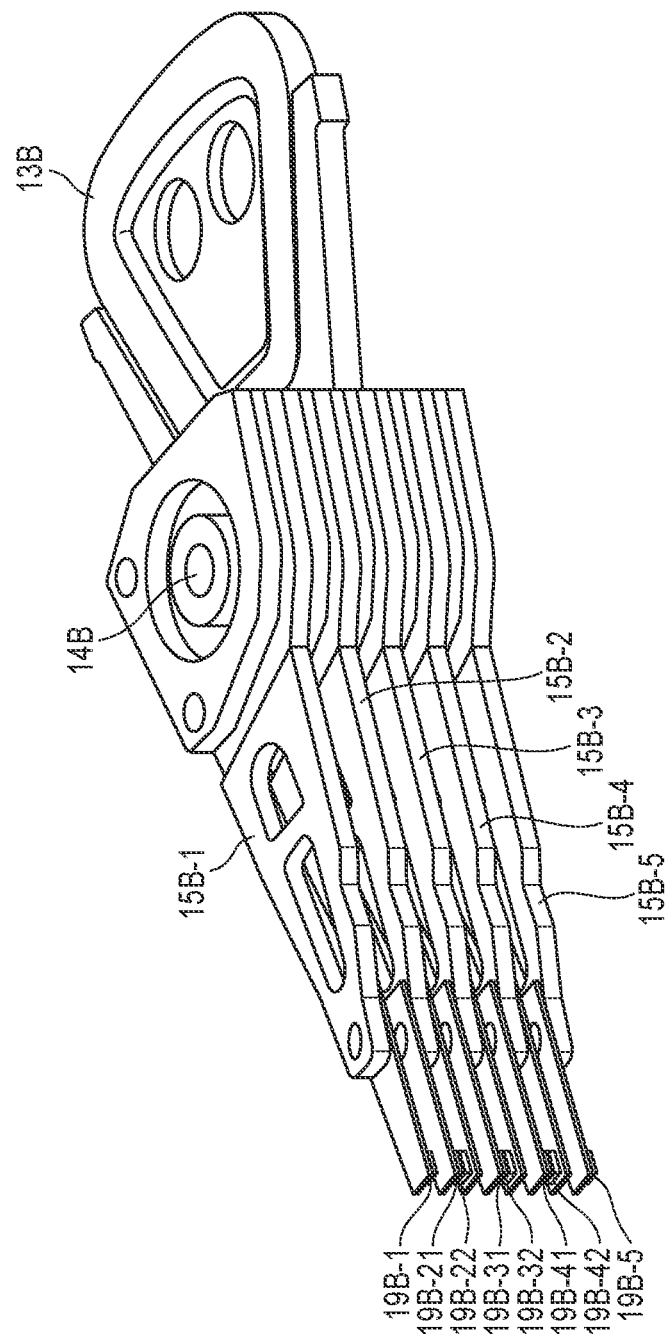
F I G. 7

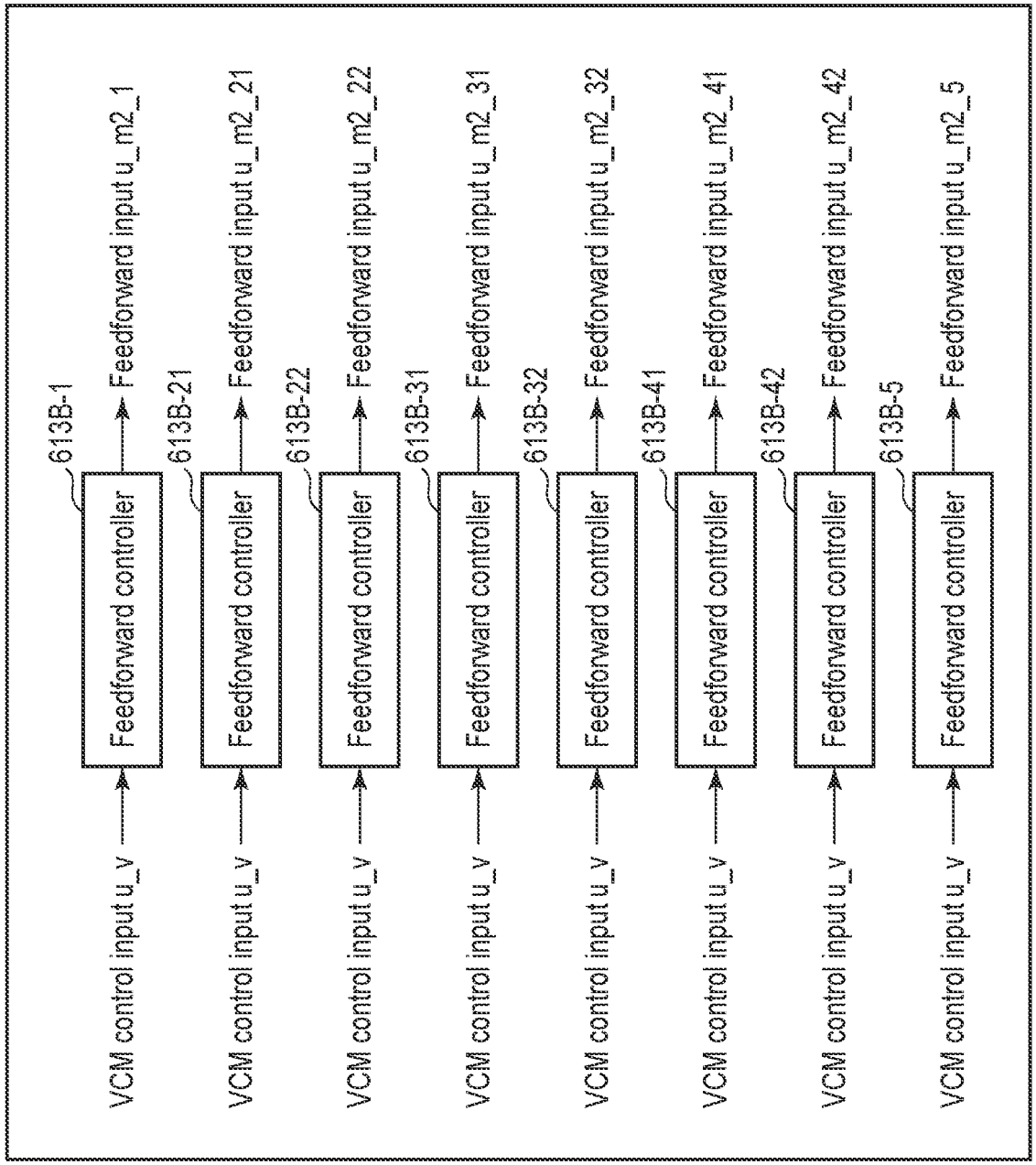
F I G. 8

(a)

| Head identification number $N_h$ | Arm position | Head attachment position | Adaptive model |
|---|---|---|---|
| 1 | Uppermost | Lower | F1,F2,F3 |
| 21 | Middle | Upper | F1,F2 |
| 22 | Middle | Lower | F1,F2 |
| 31 | Middle | Upper | F1,F2,F3 |
| 32 | Middle | Lower | F1,F2,F3 |
| 41 | Middle | Upper | F3 |
| 42 | Middle | Lower | F3 |
| 5 | Lowermost | Upper | F1,F2,F3 |

(b)

| Head identification number $N_h$ | Group | Adaptive model |
|---|---|---|
| 1 | 1 | F1,F2,F3 |
| 21 | 2 | F1,F2 |
| 22 | 2 | F1,F2 |
| 31 | 3 | F2 |
| 32 | 3 | F2 |
| 41 | 2 | F1,F2 |
| 42 | 2 | F1,F2 |
| 5 | 1 | F1,F2,F3 |

(c)

| Head identification number $N_h$ | F1 group | F2 group | F3 group |
|---|---|---|---|
| 1 | F1 | F21 | F31 |
| 21 | F1 | F22 | F31 |
| 22 | F1 | F22 | F32 |
| 31 | F1 | F22 | F32 |
| 32 | F1 | F22 | F33 |
| 41 | F1 | F22 | F33 |
| 42 | F1 | F22 | F34 |
| 5 | F1 | F21 | F34 |

F I G. 9

MAGNETIC DISK DEVICE AND HEAD CONTROL METHOD

CROSS-REFERENCE TO RELATED APPLICATIONS

This application is based upon and claims the benefit of priority from Japanese Patent Application No. 2022-151035, filed Sep. 22, 2022, the entire contents of which are incorporated herein by reference.

FIELD

Embodiments described herein relate generally to a magnetic disk device and a head control method to which feedforward control is applied.

BACKGROUND

In a magnetic disk device such as a hard disk drive (HDD), when a seek operation is executed, a voice coil motor (VCM) is accelerated and decelerated by a seek current, but at the same time, resonance modes of the VCM and the like are stimulated, and residual vibration occurs at the time of settling. When it is attempted to suppress the residual vibration by feedforward control from the seek current, a feedforward controller includes an element of a transfer function from a current input to the VCM to head displacement.

However, there is a coil twist mode as an example of a mode that is likely to appear in residual vibration in the VCM of the HDD. Since the damping coefficient is small and the vibration continues, this mode appears in the residual vibration at the time of settling after an actuator greatly moves by seek control. However, when the transfer function from the current input to the VCM to a head position is measured, the mode is buried in the rigid body mode and the main resonance mode, and it is difficult to see clearly.

BRIEF SUMMARY OF THE INVENTION

In general, according to an embodiment, a magnetic disk device comprises a head, an arm, a voice coil motor (VCM), a microactuator (MA), a servo control unit, and a feedforward control unit. The feedforward control unit receives head position information and a VCM control value as input values. The head position information is information on a current position of the head. The feedforward control unit outputs an MA control correction value to the microactuator. The feedforward control unit includes a plant model processing unit including a plant transfer function model indicating a relationship between an input value to the plant transfer function model and an output value from the plant transfer function model. The plant model processing unit further includes a plurality of submodel processing units. Based on a transfer function model provided to each of the submodel processing units, each of the submodel processing units generates a submodel output value that is an output value for the input value to be input to the plant transfer function model. The feedforward control unit generates the MA control correction value based on a plurality of the submodel output values.

An object of embodiments of the present invention is to provide a magnetic disk device and a head control method for suppressing head vibration by feedforward control.

BRIEF DESCRIPTION OF THE DRAWINGS

FIG. 1 is a configuration diagram of a magnetic disk device according to a first embodiment.

FIG. 2 is an example of a block diagram of a servo control unit and related parts in the magnetic disk device according to the first embodiment.

FIG. 3A is an example of a transfer function of a head displacement with respect to an input current to a VCM in the magnetic disk device according to the first embodiment.

FIG. 4 is a diagram explaining a processing operation procedure of the servo control unit and related parts of the magnetic disk device according to the first embodiment.

FIG. 6 is a diagram for explaining a processing operation procedure of the servo control unit and related parts in the magnetic disk device according to the second embodiment.

FIG. 7 is an image example of an actuator and related parts in a magnetic disk device according to a third embodiment.

FIG. 8 is an example of a block diagram of a servo control unit and related parts in the magnetic disk device according to the third embodiment.

FIG. 9 is example of a database that stores a submodel to be applied to a feedforward control unit for each head in the magnetic disk device according to the third embodiment.

DETAILED DESCRIPTION

Figure 3B:
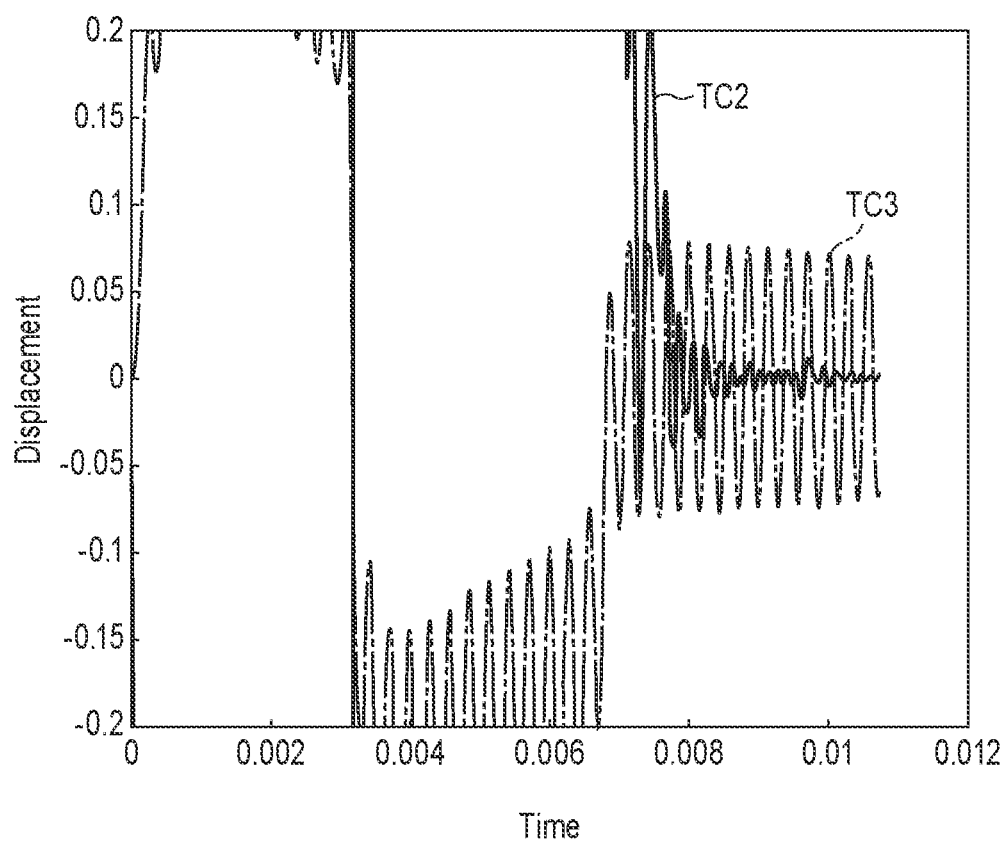
FIG. 3B is an example of a time response to a seek current of each submodel in the magnetic disk device according to the first embodiment.

Hereinafter, embodiments will be described with reference to the drawings. Note that the drawings are merely examples, and do not limit the scope of the invention.

In general, according to one embodiment, a magnetic disk device comprises a head and an arm and a voice coil motor (VCM) and a microactuator and a servo control unit and a feedforward control unit. The feedforward control unit receives head position information and the VCM control value as input values, the head position information and the VCM control value and the head position information that is information on a current position of the head, and outputs an MA control correction value to the microactuator as an output value, and includes a plant model processing unit including a transfer function model indicating a relationship between the input value and the output value. The plant model processing unit further includes a plurality of submodel processing units, based on a transfer function model provided to each of the submodel processing units. Each of the submodel processing units generates a submodel output value that is an output value for the input value to be input, and the feedforward control unit generates the output value based on a plurality of the submodel output values.

First Embodiment

A magnetic disk device according to the present embodiment decomposes a plant model of feedforward control for controlling a microactuator into a plurality of vibration modes such as a rigid body mode, a main resonance mode, and other vibration modes, defines a transfer function model for each vibration mode, and identifies and learns parameters of the transfer function model.

FIG. 1 is a configuration diagram of a magnetic disk device according to an embodiment.

A magnetic disk device 1 is a storage device including a magnetic disk (Hereinafter, it may be simply referred to as a disk) on which data is read and written, and includes a computer such as a microprocessor. The magnetic disk device 1 outputs data to a host system 2 or writes data input from the host system 2 to a magnetic disk based on a command or the like received from the connected host system 2.

The magnetic disk device 1 according to the present embodiment includes a feedforward controller that controls a microactuator 17, and the feedforward controller internally has a plant model from a control value for a VCM as an input value to a head displacement (also referred to as a control correction value of a head position) as an output value. The plant model of the feedforward controller internally connects a plurality of submodels in parallel, and uses at least one output of the plurality of submodels for feedforward control to the microactuator 17.

The host system 2 is, for example, a personal computer main body or the like, and outputs a data read/write command or the like to the magnetic disk device 1. Furthermore, the host system 2 may include a program for testing the magnetic disk device 1, and may test the magnetic disk device 1 by outputting a test signal or the like.

An HDA 10 is referred to as a head disk assembly, and a magnetic disk 11, a spindle motor (Hereinafter, sometimes referred to as SPM) 12, an arm 15 on which a head 19 is mounted, a voice coil motor (Hereinafter, it may be referred to as VCM) 13, and the like are stored in a housing. Although an example in which one disk 11 and one head 19 are installed in the HDA 10 of the present embodiment is illustrated, one or more disks and one or more heads may be provided.

The HDA 10 is fixed to the magnetic disk device 1 by housing support parts 101A, 101B, 101C, 101D (When not particularly distinguished, it is referred to as a housing support part 101), and the like. In addition to the function of fixing the HDA 10, the housing support part 101 has a function of reducing the influence on the HDA 10 due to the vibration of the entire magnetic disk device 1 by imparting a spring characteristic.

The disk 11 is a disk-type magnetic rotary disk storage medium, and a user data region available from a user and a system area in which information necessary for system management is written are allocated to a data region in which data can be written (also referred to as write). Hereinafter, a direction orthogonal to a radial direction of the disk 11 is referred to as a circumferential direction. The disk 11 is attached to the spindle motor 12 and rotates by driving of the spindle motor 12.

A plurality of tracks is set in the disk 11. In FIG. 1, three tracks TR1, TR2, and TR3 (When not particularly distinguished, the track is referred to as a track TR) are illustrated as an example, but a plurality of tracks is set concentrically around the spindle motor 12 in the data region. When read/write (reading/writing) of data of the disk 11 is executed, the head 19 is moved to the track TR on which data to be read/written (also referred to as target data) is present by seek control, tracking control, or the like, and the head 19 performs read/write. The track TR having the target data may be referred to as a target track.

Furthermore, servo information is written in the disk 11, and is used for position detection of the head 19 and the like. The servo information is installed at a predetermined position (referred to as a servo region) in the circumferential direction of the disk 11. The servo information has general contents, and detailed description thereof will be omitted. In the example of FIG. 1, three servo regions SVA1, SVA2, and SVA3 (When not particularly distinguished, it is referred to as a servo region SVA) are illustrated as an example of the servo region, but in general, the servo regions SVAs are installed at equal intervals in the entire circumferential direction of the disk 11, and the servo information is written in the servo region SVA of each track TR. The magnetic disk device 1 can detect the current position of the head 19 from the servo information read by the head 19.

The spindle motor 12 is a support of the disk 11, and is installed in a housing of a magnetic disk or the like. When the spindle motor 12 rotates, the disk 11 rotates.

The VCM 13 is a voice coil motor type actuator, and is used to move the arm 15 and the like. The VCM 13 controls an operation of the arm 15 and the like based on an input current or voltage. The VCM 13 includes a VCM coil 131 for power transmission.

A pivot 14 is a bearing for supporting the arm 15 and the like and causing the arm to rotate or the like.

The arm 15 is an arm that supports a slider 18 and the head 19, transmits power from the VCM 13 to the head 19, and moves the head 19 to the target track TR.

A suspension 16 controls an operation of the connected microactuator 17.

The microactuator 17 (also referred to as MA 17) performs highly accurate position adjustment such as tracking control of the head 19 based on an input current or voltage. The microactuator 17 is a general function and will not be described in detail, but performs fine adjustment of a position at the time of settling after seek control, and tracking control on a target track after seek control on the head 19. The settling is a time until a positioning error with respect to the target track falls within, for example, a certain threshold or less after the movement of the head 19 by the seek control, including the influence of the vibration of the head 19 by the seek control. After the vibration of the head 19 is sufficiently reduced by settling, data read/write control and tracking control are executed.

The slider 18 is a part that supports the head 19 and transmits power.

The head 19 is a part that writes data to the disk 11 and reads data recorded in a data track of the disk 11. In particular, in the case of distinction, a head that writes data to the disk 11 is referred to as a write head 19W, and a head that reads data recorded in a data track of the disk 11 is referred to as a read head 19R.

A power supply 111 is a power supply that supplies power to the VCM 13.

An FPC 112 is a flexible printed circuit (FPC), is a circuit that supplies a current or a voltage, and is connected to the power supply 111, driver IC 20, Head amplifier IC 30 and a base of the VCM 13. Since the FPC 112 vibrates by the operation of the VCM 13, it may cause residual vibration. The FPC 112 may have a unique vibration mode (referred to as an FPC mode) and will be described later.

A driver IC 20 outputs a current or a voltage for driving and controlling the SPM 12, the VCM 13, the microactuator 17, and the like according to control from an HDC 50, a servo control unit 61, and the like.

A head amplifier IC 30 includes a read amplifier and a write driver. The read amplifier amplifies a read signal read from the disk 11 and outputs an amplified read signal to an R/W channel 40. The write driver outputs a write current corresponding to a signal output from the R/W channel 40 to the head 19.

The R/W channel 40 controls reading of data from the disk 11, writing of data to the disk 11, and the like with respect to the head amplifier IC 30 in response to an instruction from the HDC 50, a main controller 60, and the like. The R/W channel 40 receives a read data signal received from the head amplifier IC 30 and extracts read data, or generates a write data signal based on write data or the like instructed to write and outputs the write data signal to the head amplifier IC 30. Furthermore, the R/W channel 40 has a function of measuring the signal quality of the read data received from the head amplifier IC 30. The R/W channel 40 may extract position information of the head 19 based on a servo information signal received from the head amplifier IC 30.

The HDC 50 is an interface between the magnetic disk device 1 and the host system 2, and is a hard disk controller that controls each part of the magnetic disk device 1. The HDC 50 may include a computer such as a CPU, an IC chip including another computer, or the like. The HDC 50 receives commands from the host system 2, such as a command to write data to the disk 11 and a command to read data from the disk 11, for example. The HDC 50 controls each unit of the magnetic disk device 1 and performs data transfer between the host system 2 and the R/W channel 40 based on the received command. The HDC 50 may control reading/writing of data from/to a volatile memory 70, a buffer memory 80, a nonvolatile memory 90, and the like.

The main controller 60 is a main controller that controls each unit of the magnetic disk device 1, and may be configured by, for example, a computer such as a microprocessor, an IC chip having other computer functions, or the like. Various processing of the main controller 60 may be executed by a program of software (including firmware and the like), or may be provided as hardware, or a combination of software and hardware.

The servo control unit 61 controls the head 19 based on, for example, a command received from host system 2. For example, the servo control unit 61 performs seek control to control the VCM 13 via the driver IC 20 in order to move the head 19 to a target position (target track). Furthermore, the servo control unit 61 controls the microactuator 17 via the driver IC 20 to execute tracking control of the head 19 after the seek control.

More specifically, the servo control unit 61 determines an input current value or an input voltage value as a control value for seek control or tracking control of the head 19 based on a target position of the head 19 determined based on a command received from the host system 2 or the like or a current position of the head 19 received from the R/W channel 40, and outputs the input current value or the input voltage value to the VCM 13 and the microactuator 17.

A read/write control unit 62 selects a storage destination (for example, information such as a data sector and a track of the disk 11) of write data, and controls a write operation of data to the disk 11. Furthermore, the main controller 60 controls a read operation of data from the disk 11, controls processing of read data read from the disk 11, and outputs the read data to the HDC 50 or the like.

A feedforward control unit 63 includes a plant model including a plurality of submodels, and various calculation units, and performs feedforward control of the microactuator 17. Each of the submodels is, for example, a digital filter defined by a transfer function model defined based on a vibration mode or the like. The feedforward control unit 63 generates a control correction value for the microactuator 17 by various data processing based on a current value that is a control value for the VCM 13 and the current position of the head 19, and outputs the control correction value to the servo control unit 61.

The servo control unit 61 adds the control correction value input from the feedforward control unit 63 to the input control value for the microactuator 17, and outputs a final control value to the microactuator 17.

Note that, in the present embodiment, the configuration in which the servo control unit 61 and the feedforward control unit 63 are separated is described, but the servo control unit 61 may be functionally integrated into one. Furthermore, in the configuration of the present embodiment, the feedforward control unit 63 receives a control value for the VCM 13 from the servo control unit 61, and receives the current position of the head 19 from the R/W channel 40.

A parameter update unit 64 performs parameter identification and parameter update of the submodel based on a control value u_v for controlling the VCM 13, the current position of the head 19, or values calculated from these values. The parameter identification means obtaining a parameter, and the parameter update means updating a parameter obtained (identified) once, but in particular, both may be used in the same meaning. The parameter update unit 64 performs the parameter identification or update using an arbitrary parameter fitting method such as a least squares method. The parameter fitting method may be various general techniques, and detailed description will be omitted. Furthermore, the parameter update unit 64 may sequentially identify or update the parameter using a sequential least squares method or the like every time the control value u_v for controlling the VCM 13 and the current position of the head 19 are obtained.

The parameter update unit 64 may store the identified or updated parameter in the volatile memory 70, the nonvolatile memory 90, or the like, and acquire and use the parameter at the time of identification or update of the next parameter. Furthermore, when the parameter is sequentially updated, the parameter update unit 64 may store the updated parameter in the buffer memory 80 or the like, and the feedforward control unit 63 may acquire the update parameter stored in the buffer memory 80 and execute the data processing by applying the acquired parameter to the submodel.

Furthermore, the VCM control value u_v, the current position of the head 19, and the like may be acquired as test data, the test data may be input, the feedforward control unit 63 may be operated at the time of calibration of the magnetic disk device 1, and the parameter update unit 64 may be caused to identify and update parameters. Furthermore, the parameter update unit 64 may perform parameter identification or parameter update using the acquired VCM control value u_v and the current position of the head 19 while the magnetic disk device 1 is in use (during operation).

The volatile memory 70 is a semiconductor memory in which stored data is lost when power supply is cut off. The volatile memory 70 stores data and the like necessary for processing in the magnetic disk device 1. The volatile memory 70 includes, for example, a dynamic random access memory (DRAM) or a synchronous dynamic random access memory (SDRAM).

The buffer memory 80 is a semiconductor memory that temporarily records data and the like transmitted and received between the magnetic disk device 1 and the host system 2. Note that the buffer memory 80 may be configured integrally with the volatile memory 70. The buffer memory 80 is, for example, a DRAM, a static random access memory (SRAM), an SDRAM, a ferroelectric random access memory (FeRAM), or a magnetoresistive random access memory (MPAMV).

The nonvolatile memory 90 is a semiconductor memory that records stored data even when power supply is cut off. The nonvolatile memory 90 is, for example, a NOR type or NAND type flash read only memory (FROM).

Various functions such as the R/W channel 40, the HDC 50, and the MPU 60 may be implemented on a large-scale integrated circuit (LSI) called a System-on-a-Chip (SoC) in which a plurality of elements is integrated on a single chip, for example, as a system controller.

FIG. 2 is an example of a block diagram of the servo control unit and related parts in the magnetic disk device according to the first embodiment.

The controller 610 is a block diagram of a controller including the functions of the servo control unit 61 and the feedforward control unit 63, and indicates a transfer function having a target position r of the head 19 as an input and a current head position y of the head 19 as an output or a controller having the transfer function.

A Cv 611 is a controller that controls the VCM 13, and is included in, for example, the servo control unit 61. The Cv 611 generates a control value u_v for controlling the VCM 13 based on an input such as a difference (referred to as a head position error) e between the target position r and the current position y of the head 19, and outputs the control value to the VCM 13. The Cv 611 represents a transfer function having the head position error e as an input and the control value u_v as an output or a controller having the transfer function. Note that, instead of the head position y, a displacement error using a target displacement amount of the head position with respect to the target position r of the head 19 may be set as e.

A Cm 612 is a controller that controls the microactuator 17, and is included in, for example, the servo control unit 61. The Cm 612 generates a control value u_m1 based on an input such as the head position error e, and outputs the control value u_m1 to the microactuator 17. The Cm 612 represents a transfer function having the head position error e as an input and the control value u_m1 as an output or a controller having the transfer function. Note that, instead of the head position, a displacement error using a target displacement amount of the head position with respect to the target position r of the head 19 may be set as e.

A Pv 131 and a Pm 171 represent transfer functions of the VCM 13 and the microactuator 17, respectively.

The controller 613 is a block diagram of a controller corresponding to the feedforward control unit 63, and includes a plant model including a plurality of submodels. Each of the submodels is a digital filter that handles digital sample values, and a relationship (transfer function) between an input and an output is modeled by a parameter, a mathematical expression, or the like. Hereinafter, the modeled transfer function may be referred to as a transfer function model.

The controller 613 in the present embodiment includes three submodels F1, F2, and F3, and outputs a control value u_m2 for the microactuator 17 using the control value u_v and the head position y as inputs. The control value u_m2 may be, for example, a current value or a voltage value. Furthermore, when the control value u_v is input, the submodels F1, F2, and F3 generate output values (referred to as submodel output values) based on the respective transfer function models. Note that each transfer function model itself may be referred to as a submodel.

The controller 613 generates an error value that is a difference between the submodel output value generated by each submodel and a value such as the head position y.

A first submodel processing unit 6131 generates an error value e1 based on a submodel output value y1 generated based on the transfer function model of the submodel F1 using the control value u_v as an input and the head position y.

A second submodel processing unit 6132 generates an error value e2 based on a submodel output value y2 generated based on the transfer function model of the submodel F2 using the control value u_v as an input and the error value e1.

A third submodel processing unit 6133 generates an error value e3 based on a submodel output value y3 generated based on the transfer function model of the submodel F3 using the control value u_v as an input and the error value e2. Moreover, the third submodel processing unit 6133 generates and outputs a control value u_m2 for the microactuator 17 based on the submodel output value y3.

The controller 613 is an example in a case where the number of submodels is three, but in a case where the number of submodels is two, it is sufficient that there are at least two of the first submodel processing unit 6131 and the third submodel processing unit 6133. In this case, the third submodel processing unit 6133 uses the error value e1 that is the output of the first submodel processing unit 6131 instead of the error value e2.

During seek control of the head 19, various vibrations occur and affect the position of the head 19. For example, any vibration mode such as a rigid body mode, a main resonance mode, a coil resonance mode, an FPC mode, and a housing support system mode can be considered. The submodels of the present embodiment are determined based on these vibration modes.

FIG. 3A is an example illustrating a frequency response of a transfer function of a head displacement with respect to an input current to the VCM in the magnetic disk device according to the first embodiment, in which FIG. 3, part (a) illustrates a gain characteristic and FIG. 3, part (b) illustrates a phase characteristic.

A transfer function TF0 indicates an example of a transfer function of a head displacement amount vy by various vibration modes with respect to the head position y with respect to the input value u_v to the VCM 13. The head displacement amount vy is assumed to be a head displacement amount caused by residual vibration. Transfer functions TF1, TF2, and TF3 are transfer functions of the respective vibration modes obtained by decomposing the transfer function TF0.

The transfer function TF1 indicates a transfer function of the rigid body mode. The rigid body mode is vibration caused by movement of the head 19 by the VCM 13, and is a mode that always occurs during seek control.

The transfer function TF2 indicates a transfer function of the main resonance mode. The main resonance mode is a vibration mode generated by a mechanism including the arm 15 or the like as a main generation source. The main resonance mode is a vibration mode that causes a position error of the head 19 and is desirably suppressed in a phase-stabilized manner by the VCM 13 rather than being suppressed by the microactuator 17.

The transfer function TF3 indicates a transfer function of a vibration mode (referred to as other vibration modes) obtained by removing TF1 and TF2 from the transfer function TF0. Other vibration modes may be a coil resonance mode, an FPC mode, a housing support system mode, and the like.

FIG. 3B is an example of a time response to a seek current of each submodel in the magnetic disk device according to the first embodiment.

A characteristic TC2 is a time response example of the second submodel processing unit 6132 (transfer function TF2), and a characteristic TC3 is a time response example of the third submodel processing unit 6133 (transfer function TF3).

The coil resonance mode is a vibration mode generated by the VCM coil 131 as a main generation source, and is a vibration mode to be suppressed by the microactuator 17.

The FPC mode is a vibration mode mainly generated from the FPC 112 along with a position fluctuation of the VCM 13 supplied with power by the FPC 112, and is a vibration mode to be suppressed by the microactuator 17.

The housing support system mode is a vibration mode generated by the housing support part 101 as a main generation source, and the influence is usually reduced by a function such as rotational vibration feed-forward control (RVFF).

The plant model of the feedforward control unit 63 in the present embodiment includes the plurality of submodels in consideration of the vibration modes. Although any method can be considered as a submodel parameter identification method in the present embodiment, an example will be described below.

(Parameter Identification Method 1)

An example will be described in which all vibration modes to be considered are submodeled as one transfer function model with respect to the plant model of the feedforward control unit 63, and parameters of the submodel are identified.

For example, it is an example in a case where the number of vibration modes to be considered is M, and one submodel is set as an entire model (sometimes referred to as an entire model) including submodels for the M vibration modes, and an input value of the entire model at time t is expressed as u(t) and an output value is expressed as y(t), and a transfer function F(s) of Laplace transforms U(s) and Y(s) is expressed as follows.

$$F(s) = \frac{Y(s)}{U(s)} = \sum_{i=1}^{M} \frac{k_i \omega_i^2}{s^2 + 2\zeta_i \omega_i s + \omega_i^2}$$ (Formula 1)

Here, s represents a Laplace operator, and $\zeta_i$, $\omega_i$, and $k_i$ represent an attenuation factor, an angular frequency, and a residue of each mode. Hereinafter, the vibration mode for the entire model is referred to as an entire vibration mode.

Although a physical model of the transfer function is shown using the Laplace operator in (Formula 1), in the feedforward control unit 63, for example, a digital sample value of the discrete time system obtained by sampling y(t) obtained from the above Formula at a sampling interval Ts is used for actual processing. A transfer function model obtained by s-z transform with respect to the transfer function model F(s) is particularly denoted as F(z). For example, when discrete time inputs and outputs at time t=j×Ts are expressed as u(j) and y(j), respectively, where j is an integer, and U(z) is input to a submodel having the transfer function model F(z), an output Y(z) is expressed as Y(z)=F(z)U(z), where the z transforms of u(j) and y(j) are U(z) and Y(z), respectively. By using a difference equation obtained by inverse z-transform from the transfer function model F(z), u(j) to y(j) can be sequentially calculated.

The parameter update unit 64 performs parameter identification on the transfer function model F(s) in (Formula 1) described above. More specifically, the parameter update unit 64 acquires an actual measurement value of the frequency response characteristic of the head position y with respect to the output u_v (VCM input) of the Cv 611 as an actual measurement value with respect to F(z). The parameter update unit 64 performs parameter identification by various parameter fitting methods based on the acquired actual measurement value. For example, in the case of using the least squares method, the parameter update unit 64 updates the parameter so as to minimize the square of a difference between y(j) and the head position y.

The parameter update unit 64 may acquire the actual measurement value of the frequency response characteristic with a function of actually measuring the actual measurement value. Furthermore, an actual measurement value acquired from the outside in advance may be stored in the nonvolatile memory 90, and the parameter update unit 64 may acquire the actual measurement value from the nonvolatile memory 90 at the time of parameter update. The transfer function model of the identified entire model may further be modeled by separating specific resonance modes as necessary.

(Parameter Identification Method 2)

An example of identifying the parameters of the submodels by applying the model illustrated in the feedforward controller 613 of FIG. 2 to the plant model of the forward control unit 63 will be described. In this example, after the transfer function models of the submodels F1, F2, and F3 are defined in advance, parameters are identified for each submodel. In this example, the entire vibration mode is mode-decomposed into three vibration modes, for example, a rigid body mode, a main resonance mode, and other specific vibration modes, and each transfer function model is defined. Note that there are various methods of mode decomposition, and the mode decomposition is not limited to this example. Hereinafter, a submodel in a mode form by a mathematical formula using a Laplace operator in this example will be described.

The vibration mode of the submodel F1 is set as a rigid body mode, and a transfer function $F_1(s)$ of an input value U(s) and an output value $Y_1(s)$ is set as follows $$F_1(s) = \frac{Y_1(s)}{U(s)} = \frac{k_1}{s^2}$$ (Formula 2)

Assuming that the vibration mode of the submodel F2 is a main resonance mode, a transfer function $F_2(s)$ of the input value U(s) and an output value $Y_2(s)$ is as follows.

$$F_2(s) = \frac{Y_2(s)}{U(s)} = \frac{k_2 \omega_2^2}{s^2 + 2\zeta_2 \omega_2 s + \omega_2^2}$$ (Formula 3)

Assuming that the vibration mode of the submodel F3 is other modes (there are M−2 modes), a transfer function $F_3(s)$ of the input value U(s) and an output value $Y_3(s)$ is as follows.

$$F_3(s) = \frac{Y_3(s)}{U(s)} = \sum_{i=3}^{M} \frac{k_i \omega_i^2}{s^2 + 2\zeta_i \omega_i s + \omega_i^2}$$ (Formula 4)

-continued $$F_3(s) = \frac{Y_3(s)}{U(s)} = \sum_{i=3}^{M} \frac{k_i \omega_i^2}{s^2 + 2\zeta_i \omega_i s + \omega_i^2}$$

Parameter identification for the model of the controller 613 will be described below. Similarly to the parameter identification method 1, the transfer function model F(z) obtained by s-z transform with respect to F(s) is used for calculation in the feedforward control unit 63.

In the controller 613 of the present embodiment, the vibration modes of F1 and F2 are set to a rigid body mode and a main resonance mode, respectively, and all adaptive parameters of the respective transfer function models $F_1(z)$ and $F_2(z)$ are fixed on the assumption that the adaptive parameters are determined in advance based on a measured value or the like. In the vibration mode of F3 in the controller 613, the transfer function model is set to $F_3(z)$ as other modes. The update timing of the target head position r and the head position y may be, for example, an acquisition interval of the servo information acquired by the head 19 (that is, a sampling interval of the servo information), or may be an arbitrary interval such as a time interval determined by a multi-rate or the like.

FIG. 4 is a diagram illustrating a processing operation procedure of the servo control unit and related parts of the magnetic disk device according to the first embodiment. This drawing is a diagram for explaining a flow of data, processing, and the like illustrated in the block diagram of FIG. 2, and is not a diagram illustrating a flowchart for fixing a processing order. Therefore, it is not always necessary to perform the processing in the order illustrated in FIG. 4, and each processing may be performed before and after the processing or may be performed simultaneously.

The servo control unit 61 calculates the head position error e based on the target position r of the head 19 determined based on the command received from the host system 2 and the current head position y of the head 19 received from the R/W channel 40, and inputs the head position error e to the Cv 611 and the Cm 612 (step S101). The Cv 611 generates and outputs a control value u_v for controlling the VCM 13 based on the input head position error e (step S102). Furthermore, the Cm 612 generates and outputs a control value u_m1 for controlling the microactuator 17 based on the input head position error e (step S1021).

The feedforward control unit 63 (corresponding to the controller 613) generates and outputs a control correction value u_m2 from an output value y3 with respect to the input value of the control value u_v to the submodel F3 through a filter (−1/Pm) (step S103). Here, Pm is a transfer function of the Pm 171.

A control value u_m (=u_m1+u_m2) obtained by adding the control correction value u_m2 to the control value u_m1 generated by the Cm 612 is input to the microactuator 17 (corresponding to the Pm 171) (step S104).

Furthermore, on the other hand, in the feedforward control unit 63, the first submodel processing unit 6131 receives the current head position y of the head 19 from the R/W channel 40, and calculates an error value e1 (=r−y1) using an output value y1 of the submodel F1 (step S108). The second submodel processing unit 6132 calculates an error value e2 (=e1−y2) from an output value y2 and the error value e1 (step S109). The third submodel processing unit 6133 calculates an error value e3 (=e2−y3) from an output value y3 and the error value e2 (step S110). The parameter update unit 64 identifies a parameter of the transfer function model of the submodel F3 based on the error value e3 (step S111).

In step S111, upon receiving the error value e3 from the feedforward control unit 63, the parameter update unit 64 identifies the parameter of the transfer function model of the submodel F3 using an arbitrary parameter fitting method such as the least squares method. For example, when the least squares method is used, the parameter update unit 64 determines $k_i$, $\zeta_i$, and $\omega_i$, which are adaptive parameters of the submodel F3, so as to minimize the square of the error value e3.

Thereafter, the parameter update unit 64 may sequentially update the parameters of the transfer function model of the submodel F3 at, for example, an acquisition interval of the servo information (that is, a sampling interval of the servo information) or the like in the same flow as described above.

The parameters of the submodels of the feedforward controller 613 can be identified by the above procedure. In the present embodiment, an error value (corresponding to the error values e1 and e2) calculated based on an output of another submodel (corresponding to F1 and F2) is used as an input for parameter update of a submodel (corresponding to F3) to be updated. That is, as illustrated in steps S108 to S111 of FIG. 4, the feedforward controller 613 of the present embodiment generates the error value e1 from the output y1 of the submodel F1 and the current position y of the head, generates the error value e2 from the output y2 of the submodel F2 and the error value e1, and generates the error value e3 from the output y3 of the submodel F3 and the error value e2, thereby reflecting the output of each submodel in another submodel in a cascading manner.

(Parameter Identification Method 3)

Furthermore, the transfer function model $F_3(s)$ of the submodel F3 may be a transfer function of any degree N as in the following formula without adopting the mode form shown in the parameter identification method 2.

(Formula 5)

$$F_3(s) =$$
$$\frac{Y_3(s)}{U(s)} = \frac{(a_N s^N + a_{N-1} s^{N-1} + a_{N-2} s^{N-2} + \ldots + a_1 s^1 + a_0 s^0)}{(b_N s^N + b_{N-1} s^{N-1} + b_{N-2} s^{N-2} + \ldots + b_1 s^1 + b_0 s^0)}$$

$$F_3(s) = \frac{Y_3(s)}{U(s)} = \frac{(a_N s^N + a_{N-1} s^{N-1} + a_{N-2} s^{N-2} + \ldots + a_1 s^1 + a_0 s^0)}{(b_N s^N + b_{N-1} s^{N-1} + b_{N-2} s^{N-2} + \ldots + b_1 s^1 + b_0 s^0)}$$

$$F_3(s) = \frac{Y_3(s)}{U(s)} = \frac{(a_N s^N + a_{N-1} s^{N-1} + a_{N-2} s^{N-2} + \ldots + a_1 s^1 + a_0 s^0)}{(b_N s^N + b_{N-1} s^{N-1} + b_{N-2} s^{N-2} + \ldots + b_1 s^1 + b_0 s^0)}$$

Here, s is a Laplace operator, and $a_N$, $a_{N-1}$, $a_{N-2}$, ..., $a_1$, $a_0$, $b_N$, $b_{N-1}$, $b_{N-2}$, ..., $b_1$, $b_0$ are adaptive parameters. For the parameter identification method, the parameter of the transfer function model of the submodel F3 is identified using the same method as that shown in the parameter identification method 2, that is, an arbitrary parameter fitting method such as a least squares method. For example, in the case of using the least squares method, the parameter update unit 64 determines $a_N$, $a_{N-1}$, $a_{N-2}$, ..., $a_1$, $a_0$, $b_N$, $b_{N-1}$, $b_{N-2}$, ..., $b_1$, $b_0$ which are adaptive parameters of the submodel F3 so as to minimize the square of the error value e3 generated similarly to the parameter identification method 2.

(Parameter Identification Method 4)

The transfer function model of the submodel F3 may be modeled by, for example, a general ARX model (autoregressive with eXogenous model) as in the following (Formula 6).

$$y_3(j) = \frac{B(q^{-1})}{A(q^{-1})}q^{-1}\text{u\_v}(j) + \frac{1}{A(q^{-1})}e3(j) \quad \text{(Formula 6)}$$

$$y_3(j) = \frac{B(q^{-1})}{A(q^{-1})}q^{-1}\text{u\_v}(j) + \frac{1}{A(q^{-1})}e3(j)$$

$$y_3(j) = \frac{B(q^{-1})}{A(q^{-1})}q^{-1}\text{u\_v}(j) + \frac{1}{A(q^{-1})}e3(j) \text{ where:}$$

$$y_3(j) = \frac{B(q^{-1})}{A(q^{-1})}q^{-1}\text{u\_v}(j) + \frac{1}{A(q^{-1})}e3(j)A(q^{-1}) = \quad \text{(Formula 6-1)}$$

$$1 + a_1 q^{-1} + a_2 q^{-2} + \ldots a_n q^{-n}$$

$$y_3(j) = \frac{B(q^{-1})}{A(q^{-1})}q^{-1}\text{u\_v}(j) + \frac{1}{A(q^{-1})}e3(j)B(q^{-1}) = \quad \text{(Formula 6-2)}$$

$$1 + b_1 q^{-1} + b_2 q^{-2} + \ldots b_n q^{-n}$$

$$y_3(j) = \frac{B(q^{-1})}{A(q^{-1})}q^{-1}\text{u\_v}(j) + \frac{1}{A(q^{-1})}e3(j)$$

and q indicates a sample delay of the discrete time system, and j is an integer and indicates time t=j×Ts time (or sample order) with respect to the sample interval Ts. $y3(j)$, $u\_v(j)$, and $e3(j)$ respectively indicate the output y3 to the submodel 3, the input u_v, and the error value e3 to the third submodel processing unit 6133 at the calculation time t of $y3(j)$.

In this example, $a_1, a_2, \ldots, a_n, b_1, b_2, \ldots, b_n$ in (Formula 6-1) and (Formula 6-2) are set as adaptive parameters to be identified. For example, in the case of using the successive least squares method, the parameter update unit 64 determines and updates $a_1, a_2, \ldots, a_n, b_1, b_2, \ldots,$ and $b_n$ that are adaptive parameters of the submodel F3 so as to minimize the square of the error value $e3(j)$ generated in the same manner as the parameter identification method 2 for each time t=jTs. The update timing of the parameters may be any timing such as servo information acquisition timing.

The above parameter identification or update may be performed using a test signal at the time of design, manufacturing, adjustment, or the like, or may be readjusted in a field after shipment, for example. As the test signal, arbitrary data such as simulation data or actual measurement data of the VCM control value u_v or the head position y which is an input value to the feedforward control unit 63 (corresponding to the controller 613) may be used. In a case where the magnetic disk device 1 has a function of generating a test signal, for example, calibration and adjustment may be performed using the test signal when the head 19 does not access the disk 11.

Furthermore, the test signal and the parameter identification method to be input for each submodel may be arbitrarily changed. The input signal is based on, for example, a trapezoidal wave, and the height, width, slope inclination, and the like of the trapezoidal wave may be changed so that a target vibration mode can be easily identified.

(Parameter Identification Method 5)

The parameters identified by the parameter identification method 4 may be adaptively updated only for the submodel that generates the MA control correction value output to the MA 17 as the feedforward control.

For example, the parameters of the transfer function model of the submodels F1 and F2 in FIG. 2 are fixed, and the parameters of the transfer function model are adaptively updated only for the submodel F3. Also in the present method, in the parameter update of the submodel adaptively updated (corresponding to F3), outputs of other submodels (corresponding to F1 and F2) are reflected in a cascading manner similarly to the procedure of steps S108 to S111 of FIG. 4. The update timing at the time of adaptive update may be, for example, a servo information acquisition timing, may be performed using a test signal at the time of design, manufacturing, adjustment, or the like, or may be performed using a VCM control value u_v, an actual measurement value of the head position y, or the like during operation such as seek control.

Furthermore, the updated parameters may be stored in, for example, the nonvolatile memory 90, and the feedforward control unit 63 and the parameter update unit 64 may acquire the latest parameters from, for example, the nonvolatile memory 90 when the power supply to the magnetic disk device 1 is turned on. The feedforward control unit 63 may execute data processing by the submodel based on the acquired parameters, and the parameter update unit 64 may execute further parameter update based on the acquired parameters.

According to the present embodiment, the parameters of the submodel of the feedforward control unit 63 are identified and updated, thereby implementing feedforward control in consideration of a resonance mode or the like appearing in residual vibration.

Second Embodiment

In the present embodiment, an example is illustrated in which, after each model is defined in advance as in the parameter identification method 2, all the parameters of the submodels of the feedforward control unit 63 are adaptively updated, and outputs of other submodels are used for updating the submodels F2 and F3. A configuration of a magnetic disk device of the present embodiment is similar to the configuration of FIG. 1, but in order to distinguish from other embodiments, A is added to the end of the reference sign of FIG. 1 for the reference sign assigned to the configuration block. Hereinafter, description of functions having no particular difference will be omitted.

Figure 5:
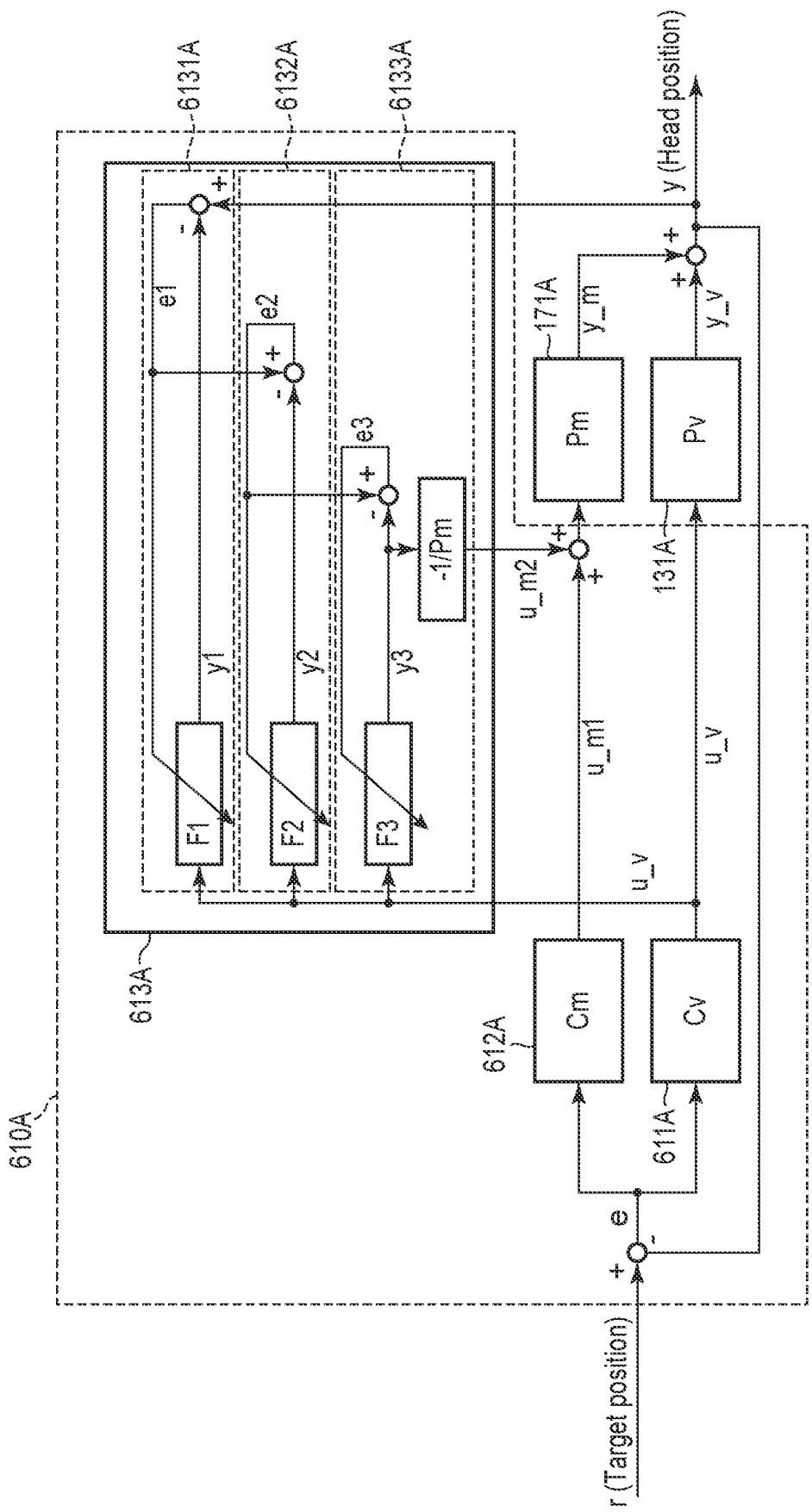
FIG. 5 is an example of a block diagram of a servo control unit and related parts in a magnetic disk device according to a second embodiment.

FIG. 5 is an example of a block diagram of a servo control unit and related parts in the magnetic disk device according to the second embodiment. The configuration of FIG. 5 is similar to the configuration of FIG. 2, but A is added to the end of the reference sign of FIG. 2 to distinguish it from other embodiments. Hereinafter, description of functions having no particular difference will be omitted, and only controller 613A which is a difference from FIG. 2 will be described.

The controller 613A includes three submodels F1, F2, and F3, but adaptively updates all the submodels, and uses outputs of other submodels for updating the submodels F2 and F3.

Similarly to the first embodiment, the submodel F1 is set to the rigid body mode, the submodel F2 is set to the main resonance mode, and the models of the respective transfer functions are set to (Formula 2) and (Formula 3) described above. The submodel F3 may use any of (Formula 4), (Formula 5), and (Formula 6) as other modes.

FIG. 6 is a diagram illustrating a processing operation procedure of the servo control unit and related parts in the magnetic disk device according to the second embodiment. This drawing is a diagram for describing a flow of data, processing, and the like illustrated in the block diagram of FIG. 5, and is not a diagram illustrating a flowchart for fixing a processing order. Therefore, it is not always necessary to perform the processing in the order illustrated in FIG. 6, and each processing may be performed before and after the processing or may be performed simultaneously.

The servo control unit 61A calculates a head position error e based on a target position r of a head 19A determined based on the command received from a host system 2 and a current head position y of the head 19A received from an R/W channel 40A, and inputs the head position error e to a Cv 611A and a Cm 612A (step S201). The Cv 611A generates and outputs a control value u_v for controlling a VCM 13A based on the input head position error e (step S202). Furthermore, the Cm 612A generates and outputs a control value u_m1 for controlling a microactuator 17A based on the input head position error e (step S2021).

The feedforward control unit 63A (corresponding to the controller 613A) receives the current head position y of the head 19A from the R/W channel 40A, and a first submodel processing unit 6131A calculates an error value e1 (=r−y1) using an output value y1 with respect to the input value of the control value u_v of the submodel F1 (step S211). Upon receiving the error value e1 from the feedforward control unit 63A, a parameter update unit 64A identifies the parameters of the transfer function model of the submodel F1 by using an arbitrary parameter fitting method (step S212). In step S212, for example, when the least squares method is used, the parameter update unit 64A determines the adaptive parameters of the submodel F1 so as to minimize the square of the error value e1.

A second submodel processing unit 6132A calculates an error value e2 (=e1−y2) from an output value y2 of the submodel F2 and the error value e1 (step S213). Upon receiving the error value e2 from the feedforward control unit 63A, the parameter update unit 64A identifies the parameters of the transfer function model of the submodel F2 using an arbitrary parameter fitting method (step S214). In step S214, for example, when the least squares method is used, the parameter update unit 64A determines the adaptive parameters of the submodel F2 so as to minimize the square of the error value e2.

A third submodel processing unit 6133A calculates an error value e3 (=e2−y3) from an output value y3 of the submodel F3 and the error value e2 (step S215). Upon receiving the error value e3 from the feedforward control unit 63A, the parameter update unit 64A identifies the parameters of the transfer function model of the submodel F3 using an arbitrary parameter fitting method (step S216). In step S216, for example, when the least squares method is used, the parameter update unit 64A determines the adaptive parameters of the submodel F3 so as to minimize the square of the error value e3.

The parameter update unit 64A may sequentially update the adaptive parameters of the transfer function models of the submodels F1, F2, and F3 in a similar flow thereafter, for example, at an acquisition interval of the servo information (that is, a sampling interval of the servo information).

With the above procedure, parameters can be identified and updated for the three submodels of the controller 613A.

Third Embodiment

The present embodiment shows an example in which, in a case where a magnetic disk device includes a plurality of disks, a plurality of heads that read and write data of the plurality of disks, a plurality of arms that drive the plurality of heads, and the like, a submodel can be selected for each head. A configuration of the magnetic disk device of the present embodiment is similar to the configuration of FIG. 1 except for the HDA 10, but B is added at the end of the reference sign of FIG. 1 for the reference sign assigned to the configuration block in order to distinguish the magnetic disk device from other embodiments. Hereinafter, description of functions having no particular difference will be omitted.

FIG. 7 is an image example of an actuator and related parts in the magnetic disk device according to the third embodiment.

Five arms 15B-$N_h$ (An arm is referred to as an arm 15B unless otherwise specified) controllable by a VCM 13B are attached to a pivot 14B. Heads 19B-$N_h$ (A head is referred to as a head 19B unless otherwise specified) to be controlled are attached to the arms 15B-$N_h$, respectively.

For example, the arm 15B-1 is an arm to which the head 19B-1 is attached and for controlling and moving the head 19B-1. Furthermore, like the arm 15B-2, two heads 19B-21 and 19B-22 may be attached vertically. The arm 15B-2 controls and moves each of the two heads. Similarly, the arm 15B-3 is an example in which two heads, heads 19B-31 and 19B-32, are attached vertically, and the arm 15B-4 is an example in which two heads, heads 19B-41 and 19B-42, are attached vertically. The arm 15B-5 is an example in which one head 19B-5 is attached. That is, in this example, the number of $N_h$ is 8.

Furthermore, although reference signs are not illustrated in FIG. 7, other functions illustrated in FIG. 1, for example, a suspension 16, a microactuator 17, a slider 18, and the like are also included, and it is assumed that these are similarly installed for each head 19B, and when referring to them, a head identification number $N_h$ is assigned to the reference signs to distinguish them from other embodiments. For example, a microactuator that controls the heads 19B-31 and 19B-32 is shown as microactuators 17B-31 and 17B-32.

In the present embodiment, in consideration of the fact that the influence of the residual vibration on the head 19B varies depending on an attachment position of the arm 15B or the head 19B, a model of a transfer function from the current control value input to the VCM 13B to the head position is defined for each head 19B, and parameter identification or update is performed for each head.

FIG. 8 is an example of a block diagram of a servo control unit and related parts in the magnetic disk device according to the third embodiment.

In the present embodiment, the individual configurations of a feedforward controller 613B installed as many as the heads 19B are similar to those in FIGS. 2 and 5, but in order to distinguish from other embodiments, B is added at the end of the reference sign in FIG. 2 for the reference sign to be added to the configuration block. Hereinafter, description of functions having no particular difference will be omitted. Furthermore, the feedforward controller 613B is installed in each of the eight heads 19B, and is distinguished by assigning a head identification number $N_h$ to a sign.

Each of the feedforward controllers 613B-Nh receives a VCM control input u_v, and outputs u_m2_$N_h$ for each of the feedforward controllers 613B-$N_h$. u_m2_$N_h$ corresponds to u_m2 in FIG. 2, and indicates u_m2 (feedforward input) output for each feedforward controller 613B-$N_h$. For example, the feedforward controller 613B-31 receives the VCM control input u_v and outputs u_m2_31.

In the magnetic disk device 1B of the present embodiment, a controller 610B is installed in each of the eight heads 19B, and is distinguished by assigning a head identification number $N_h$ to a reference sign. For example, the controllers 610B-$N_h$ control the heads 19B-$N_h$. Specifically, the controllers 610B-21 and 610B-22 are installed in the heads 19B-21 and 19B-22, respectively. The controllers 610B-$N_h$ are denoted as controllers 610B unless otherwise distinguished. Furthermore, the internal blocks of the controllers 610B-$N_h$ are similar to those of the controller 610 of FIG. 2, and when referred to, they are denoted by reference numerals obtained by adding B-$N_h$ to the reference numerals illustrated in FIG. 2. For example, the controller 613 in the controller 610 in FIG. 2 is shown as controllers 613B-$N_h$ in controllers 610B-$N_h$.

Each controller 610B is similar to the controller 610 of FIG. 2 and the controller 610A of FIG. 5, and indicates a transfer function that receives the target position r0$N_h$ and the head position y_s with respect to the head 19B-$N_h$ to be controlled and outputs control inputs u_m1+u_m2 and u_v or a controller having the transfer function. For example, a target position r031 is input to the controller 610B-31 for the head 19B-31, and the control inputs u_m1_31+u_m2_31 and u_v31 are output.

FIG. 9 is example of a database that stores a submodel to be applied to a feedforward control unit for each head in the magnetic disk device according to the third embodiment. The database is stored in, for example, a nonvolatile memory 90B.

In the example of the database of FIG. 9, part (a) information related to the heads 19B-$N_h$ is stored for each row. "Head identification number Nh" indicates information (head identification information) for identifying the head assigned to the heads 19B-$N_h$, "arm position" indicates a position of the arm 15B to which the heads 19B-$N_h$ are connected, "head attachment position" indicates a vertical position of the heads 19B-$N_h$, and "adaptive model" indicates an adaptive model applied to the submodel of the controllers 610B-$N_h$ corresponding to a feedforward control unit of the controllers 613B-$N_h$. The adaptive model is a model as shown in the above Formulas (1) to (6).

For example, the data D21 indicates that the head 19B-21 with the head identification number 21 is installed on the arm 15B-2, the arm 15B-2 is installed inside the other arms 15B as illustrated in FIG. 7, the head 19B-21 is installed on an upper side of the two installed on the arm 15B-2, and the controller 613B-21 corresponding to the feedforward control unit 63B of the controller 610B-21 that controls the head 19B-21 includes two submodels F1 and F2.

FIG. 9, part (a) is just an example, and items of data may be increased or decreased as necessary. For example, when the heads 19B-$N_h$ can be specified if there are an "arm position" and a "head attachment position", the "head identification number Nh" may not be provided. That is, when any one of the "arm position" and the "head attachment position" to which the heads 19B-$N_h$ are connected is input to the database, the number and contents of the submodels of the controllers 613B-$N_h$ may be automatically associated with each other. Furthermore, although the uppermost, middle, and lowermost three "arm positions" are illustrated, they may be more finely divided or roughly divided in consideration of a vibration mode or the like for each arm 15B.

In the "adaptive model", one or more adaptive submodels may be selected in advance and stored in consideration of the "arm position", the "head attachment position", and the like for each head 19B-$N_h$. FIG. 9, part (a) illustrates an example of a case where the entire vibration mode is divided into three submodels F1, F2, and F3. A vibration mode is determined for each submodel, and a transfer function model modeled by a formula or a parameter according to the vibration mode is determined in advance and stored in a database.

For example, an "adaptive model" of the data D5 indicates that the controller 613B-5 includes three submodels F1, F2, and F3. Assuming that the controller 613B-5 has the same configuration as the controller 613A in FIG. 5, parameters of the transfer function models of the submodels F1, F2, and F3 can be identified and updated by the procedure of FIG. 6 illustrated in the second embodiment.

Each of the controllers 613B-$N_h$ acquires the adaptive model of the head 19B-$N_h$ to be controlled from the database, and identifies or updates the parameter of the submodel by the method described in the first and second embodiments based on the acquired information. Furthermore, the controllers 613B-$N_h$ generate MA control correction values (corresponding to u_m2 in FIG. 2) for the microactuators 17B-$N_h$, respectively.

Each of the controllers 610B-$N_h$ generates a control value (corresponding to u_v and u_m1 in FIG. 2) for the VCM 13B or the microactuators 17B-$N_h$ based on the target position r0$N_h$, the head position y0$N_h$, and the MA control correction value output from the controllers 613B-$N_h$. The VCM 13B or the microactuators 17B-$N_h$ control the head 19-$N_h$ based on the input control value, and the head position y-$N_h$ (=y_m-$N_h$+y_v-$N_h$) is determined.

For example, when the power supply to the magnetic disk device 1B according to the present embodiment is turned on, each controller 613B-$N_h$ of the feedforward control unit 63B acquires the latest parameter from, for example, the nonvolatile memory 90B or the parameter update unit 64B-$N_h$, and executes the digital filter processing by the adaptive model set based on the acquired parameter. Furthermore, the parameter update unit 64B-$N_h$ may execute further parameter update based on the parameter acquired from the nonvolatile memory 90B and provide the updated parameter to each controller 613B-$N_h$.

Note that, in the database, at least the adaptive model may be associated with the head identification number $N_h$ as the head identification information. For example, the "adaptive model" is separately determined from the "arm position" and the "head attachment position" of the heads 19B-$N_h$, and only the "head identification number $N_h$" and the "adaptive model" are stored in the database.

In the example of the database of FIG. 9, part (b) information related to the heads 19B-$N_h$ is stored for each row, a "group" for identifying a group is set for each head 19B-$N_h$, and one or more "adaptive models" are designated according to the set "group". Although FIG. 9 is illustrated separately, the number of columns of "group" may be increased in FIG. 9, part (a) to form the same database.

The "group" is, for example, a group determined based on a grouping criterion such as similarity of vibration modes of the heads 19B-$N_h$, and the value of the "group" may be stored in the database in advance based on a grouping criterion.

FIG. 9, part (b) illustrates an example in which the "group" is divided into 1 to 3 and designated for each head 19B-$N_h$. The grouping criterion may be an arm position of the heads 19B-$N_h$, a head attachment position, or the like in addition to the similarity of the vibration modes, or the criterion may be changed according to the number of heads 19B or the like.

The "adaptive model" in FIG. 9, part (b) may be associated with a "group" so as to be automatically determined when the "group" is determined, or may be designated independently of the "group". For example, data D22 and data D42 in FIG. 9, part (b) are examples in a case where the adaptive models are automatically set as F1 and F2 when the group is designated as 2.

The "group" may be used to automatically designate the "adaptive model" associated as described above, or may be associated with the parameter update frequency of the adaptive model included in the "group". For example, the parameter update unit 64B updates the parameters of the submodels of the controllers 613B-$N_h$ at the parameter update frequency of the "group" associated with each of the heads 19B-$N_h$.

In the example of the database of FIG. 9, part (c), information related to the heads 19B-$N_h$ is stored for each row, and unlike the case of FIG. 9, part (b) all the heads 19B include three submodel processing units (F1 group, F2 group, F3 group). When the database of FIG. 9, part (c) is viewed in a column direction (vertical direction), the F1 group includes the submodel F1 in common for all heads, the F2 group includes two types of submodels of the outer arm F21 and the inner arm F22, and the F3 group is an example in which two heads are grouped and four types of submodels of F31, F32, F33, and F34 are included from the top.

Furthermore, when the database of FIG. 9, part (c) is viewed in the column direction (vertical direction), for example, the data D31 of FIG. 9, part (c) indicates that the submodel processing unit (F1 group) for the head 19B-31 includes the submodel F1, the submodel processing unit (F2 group) includes the submodel F22, and the submodel processing unit (F3 group) includes the submodel F32. Similarly, the data D41 indicates that the submodel processing unit (F1 group) for the head 19B-41 includes the submodel F1, the submodel processing unit (F2 group) includes the submodel F22, and the submodel processing unit (F3 group) includes the submodel F33.

As described above, the heads 19B can be variously grouped such as a combination of submodel processing units and a combination of submodels.

According to the above procedure, the magnetic disk device 1B can determine the submodels of the plurality of controllers 613B-$N_h$ according to the arm positions, the head attachment positions, and the like of the plurality of heads 19B-$N_h$. Furthermore, the magnetic disk device 1B can determine the submodels of the plurality of controllers 613B-$N_h$ based on the group obtained by grouping the plurality of heads 19B-$N_h$ based on the grouping criterion. The magnetic disk device 1B can perform feedforward control on each of the heads 19B-$N_h$ by the controllers 613B-$N_h$ including one or more submodels that control each of the heads 19B-$N_h$.

According to at least one embodiment described above, it is possible to provide a magnetic disk device and a head control method that suppress head vibration by feedforward control.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Furthermore, the processing illustrated in the flowcharts, the sequence charts, and the like may be realized by software (programs and the like) operated by hardware such as a CPU, an IC chip, a digital signal processing processor (digital signal processor or DSP), a computer including a microcomputer, or the like, or a combination of hardware and software. Furthermore, the device of the present invention is also applied to a case where a claim is expressed as a control logic, a case where a claim is expressed as a program including an instruction for executing a computer, and a case where a claim is expressed as a computer-readable recording medium describing the instruction. Furthermore, names and terms used are not limited, and even other expressions are included in the present invention as long as they have substantially the same content and the same purpose.

What is claimed is:

1. A magnetic disk device comprising:
   a head that reads and writes data from and to a magnetic disk;
   an arm supporting the head;
   a voice coil motor (VCM) that controls the arm for seek control of the head;
   a microactuator (MA) that adjusts a position of the head;
   a servo control unit that generates a VCM control value input to the VCM and an MA control value input to the microactuator; and
   a feedforward control unit that receives the VCM control value and head position information that is information on a current position of the head, and outputs an MA control correction value to the microactuator,
   wherein the feedforward control unit includes a plant model processing unit including a plant transfer function model indicating a relationship between an input value to the plant transfer function model and an output value from the plant transfer function model,
   the plant model processing unit further includes a plurality of submodel processing units,
   based on a transfer function submodel provided to each of the submodel processing units, each of the submodel processing units generates a submodel output value that is an output value for the input value to be input to the plant transfer function model, and
   the feedforward control unit generates the MA control correction value based on a plurality of the submodel output values.

2. The magnetic disk device according to claim 1, wherein at least one submodel processing unit of the submodel processing units includes an updatable adaptive parameter for a given transfer function submodel, and
   the feedforward control unit updates the adaptive parameter based on the VCM control value and the head position information.

3. The magnetic disk device according to claim 2, wherein the feedforward control unit includes:
   a first submodel processing unit that outputs a first submodel output value and generates a first error value from the first submodel output value and the head position information; and
   a second submodel processing unit that outputs a second submodel output value and generates a second error value from the second submodel output value and the first error value, and
   generates the output value based on the second submodel output value, and
   one of the first submodel processing unit and the second submodel processing unit updates the adaptive parameter based on the generated error value.

4. The magnetic disk device according to claim 3, wherein the feedforward control unit further includes
   a plurality of third submodel processing units that outputs a third submodel output value and generates a third error value from the third submodel output value and an error value received from another one submodel processing unit, and at least one of the submodel processing units updates the adaptive parameter based on the generated error value.

5. The magnetic disk device according to claim 1, wherein the submodel processing units include a second transfer function submodel determined based on a vibration mode that affects a position of the head.

6. The magnetic disk device according to claim 5, wherein the vibration mode includes a rigid body mode of the VCM.

7. The magnetic disk device according to claim 6, wherein the vibration mode includes a main resonance mode of the VCM.

8. The magnetic disk device according to claim 5, wherein the submodel processing units include a third transfer function submodel defined by an autoregressive exogenous (ARX) model.

9. The magnetic disk device according to claim 8, further comprising:
  a plurality of the heads; and
  a VCM that controls the heads; a plurality of the arms; a plurality of the microactuators; a plurality of the feedforward control units; a plurality of the servo control units; and a storage unit that stores a first database,
  wherein the first database stores:
  head identification information that is information for identifying the heads; and a fourth transfer function submodel to be applied to a submodel associated with the head identification information, and
  the feedforward control units determine a fifth transfer function submodel of the submodel processing units based on the first database.

10. The magnetic disk device according to claim 9, wherein the head identification information is a combination of an attachment position of each of the arms to which each of the heads is attached, and a vertical position of the head.

11. The magnetic disk device according to claim 10, further comprising:
  a second database that groups the heads according to a preset grouping criterion, and includes a group identification number associated with each of the heads and an adaptive model associated with the group identification number,
  wherein the feedforward control units determine a sixth transfer function submodel of the submodel processing units based on the second database.

12. A head control method in a magnetic disk device including:
  a head that reads and writes data from and to a magnetic disk;
  an arm supporting the head;
  a voice coil motor (VCM) that controls the arm for seek control of the head;
  a microactuator (MA) that adjusts a position of the head;
  a servo control unit that generates a VCM control value input to the VCM and an MA control value input to the microactuator; and
  a feedforward control unit that receives the VCM control value and head position information that is information on a current position of the head, and outputs an MA control correction value to the microactuator, the feedforward control unit including a plant model including a plant transfer function model indicating a relationship between an input value to the plant transfer function model and an output value from the plant transfer function model, the head control method comprising:
  decomposing the plant transfer function model into a plurality of transfer function submodels; providing a transfer function submodel to each of the submodels;
  based on the provided transfer function submodel, generating a submodel output value that is an output value for the input value to be input to the plant transfer function model; and
  generating the MA control correction value based on a plurality of the submodel output values.

\* \* \* \* \*